United States Patent
Xing et al.

(10) Patent No.: US 12,182,156 B2
(45) Date of Patent: *Dec. 31, 2024

(54) MANAGING EXTRACT, TRANSFORM AND LOAD SYSTEMS

(71) Applicant: International Business Machines Corporation, Armonk, NY (US)

(72) Inventors: Chengxuan Xing, Romsey (GB); Doina Liliana Klinger, Winchester (GB); Alexander Robert Wood, Romsey (GB); Tom Soal, Whitehill (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,356

(22) Filed: Sep. 25, 2023

(65) Prior Publication Data

US 2024/0012829 A1   Jan. 11, 2024

Related U.S. Application Data

(63) Continuation of application No. 17/362,157, filed on Jun. 29, 2021, now Pat. No. 11,841,871.

(51) Int. Cl.
*G06F 17/00* (2019.01)
*G06F 11/14* (2006.01)
(Continued)

(52) U.S. Cl.
CPC ........ *G06F 16/254* (2019.01); *G06F 11/1402* (2013.01); *G06F 11/3414* (2013.01); *G06F 16/215* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,260,894 B2   9/2012   Chun
8,346,892 B2   1/2013   Chun
(Continued)

FOREIGN PATENT DOCUMENTS

CN    106502792 A    3/2017
CN    106663036 A    5/2017
(Continued)

OTHER PUBLICATIONS

"Best practices for avoiding rate limiting", Zendesk Developer Docs, downloaded from the internet on Jun. 23, 2021, 1 page, <https://developer.zendesk.com/documentation/ticketing/using-the-zendesk-api/best-practices-for-avoiding-rate-limiting/>.
(Continued)

*Primary Examiner* — Hung D Le
(74) *Attorney, Agent, or Firm* — Michael A. Petrocelli (57) ABSTRACT

An approach to implement an extract, transform and load system, a queue is provided for holding units of data between extraction and transformation. When units of data suffer a rate limit error in the load phase, they are requeued so they can be resubmitted for transformation. The contents of the queue are monitored and, if too many requeued units of data are detected in the queue, then this is taken as an indicator of an unacceptable number of rate limit errors and active pacing management is triggered. A retry schedule is defined for the requeued units of data. Extraction is temporarily halted to allow the requeued units of data to be retransformed without more units of data queuing up. Then, after the suspension is lifted, a pacing delay is inserted between subsequent extract events to avoid the same load phase bottleneck recurring.

20 Claims, 7 Drawing Sheets

(51) Int. Cl.
*G06F 11/34* (2006.01)
*G06F 16/215* (2019.01)
*G06F 16/25* (2019.01)

(56) References Cited

U.S. PATENT DOCUMENTS

| | | | |
|---|---|---|---|
| 8,468,251 B1 | 6/2013 | Pijewski | |
| 8,473,960 B2* | 6/2013 | Chambliss | G06F 9/5083 |
| | | | 709/224 |
| 8,533,103 B1* | 9/2013 | Certain | G06Q 30/06 |
| | | | 705/37 |
| 8,620,774 B1 | 12/2013 | Li | |
| 8,930,489 B2* | 1/2015 | Goetz | H04L 47/22 |
| | | | 709/224 |
| 8,990,452 B2* | 3/2015 | Branson | G06F 9/4843 |
| | | | 718/103 |
| 9,009,330 B2 | 4/2015 | Holloway | |
| 9,766,960 B2* | 9/2017 | Wang | G06F 9/546 |
| 9,842,045 B2 | 12/2017 | Heorhiadi | |
| 10,033,702 B2* | 7/2018 | Ford | G06F 21/64 |
| 10,037,230 B2* | 7/2018 | Chen | G06F 9/5027 |
| 10,088,880 B2 | 10/2018 | Sundaram | |
| 10,108,683 B2* | 10/2018 | Dhayapule | G06F 16/84 |
| 10,169,479 B2 | 1/2019 | Holloway | |
| 10,228,974 B2* | 3/2019 | Xue | G06F 9/5027 |
| 10,268,839 B1* | 4/2019 | Kenthapadi | G06F 21/6254 |
| 10,382,380 B1* | 8/2019 | Suzani | H04L 47/629 |
| 10,387,078 B1 | 8/2019 | Benisty | |
| 10,452,843 B2 | 10/2019 | Dykes | |
| 10,547,456 B1 | 1/2020 | Liljenstolpe | |
| 10,613,903 B1* | 4/2020 | Kulkarni | G06F 9/5011 |
| 10,621,263 B2 | 4/2020 | Holloway | |
| 10,678,315 B2 | 6/2020 | Sundaram | |
| 10,754,868 B2* | 8/2020 | Karuppiah | G06F 16/254 |
| 10,762,193 B2 | 9/2020 | Lev-Ran | |
| 10,764,244 B1 | 9/2020 | Mestery | |
| 10,785,122 B2 | 9/2020 | Inamdar | |
| 10,795,992 B2 | 10/2020 | Dykes | |
| 10,805,213 B2 | 10/2020 | Pilkington | |
| 10,827,020 B1 | 11/2020 | Cao | |
| 10,841,336 B2 | 11/2020 | Cahana | |
| 10,922,377 B2 | 2/2021 | Holloway | |
| 10,931,744 B1 | 2/2021 | Liljenstolpe | |
| 10,938,691 B1 | 3/2021 | Bonas | |
| 10,958,662 B1 | 3/2021 | Sole | |
| 10,999,312 B2 | 5/2021 | Viswambharan | |
| 11,018,991 B1 | 5/2021 | Vishwakarma | |
| 11,042,415 B2 | 6/2021 | Wood | |
| 11,134,058 B1 | 9/2021 | Sole | |
| 11,150,963 B2 | 10/2021 | Nainar | |
| 11,171,842 B2 | 11/2021 | Palladino | |
| 11,175,939 B2 | 11/2021 | Kumatagi | |
| 11,201,787 B1 | 12/2021 | Oppenheimer | |
| 11,221,943 B2 | 1/2022 | Gamliel | |
| 11,249,856 B2 | 2/2022 | Natanzon | |
| 11,252,091 B1 | 2/2022 | Singh | |
| 11,283,865 B2 | 3/2022 | Madisetti | |
| 11,290,284 B2 | 3/2022 | Liljenstolpe | |
| 11,316,690 B2 | 4/2022 | Madisetti | |
| 11,316,933 B2 | 4/2022 | Madisetti | |
| 11,321,419 B2 | 5/2022 | Holloway | |
| 11,356,324 B2 | 6/2022 | Gefen | |
| 11,375,033 B1* | 6/2022 | Sreenivas Prasad | H04L 67/56 |
| 11,388,234 B2 | 7/2022 | Alagna | |
| 11,399,013 B2 | 7/2022 | Bandi | |
| 11,405,451 B2 | 8/2022 | Pinheiro | |
| 11,412,000 B2 | 8/2022 | Khouderchah | |
| 11,416,380 B2 | 8/2022 | Gefen | |
| 11,444,924 B2 | 9/2022 | Patwardhan | |
| 11,456,936 B2 | 9/2022 | Bonas | |
| 11,457,040 B1 | 9/2022 | Sole | |
| 11,457,080 B1 | 9/2022 | Meduri | |
| 11,477,197 B2 | 10/2022 | Mital | |
| 11,489,738 B2 | 11/2022 | Palladino | |
| 11,558,265 B1 | 1/2023 | Poornachandran | |
| 11,561,868 B1 | 1/2023 | Poornachandran | |
| 11,570,264 B1 | 1/2023 | Poornachandran | |
| 11,582,589 B2 | 2/2023 | Taft | |
| 11,595,303 B2 | 2/2023 | Wang | |
| 2005/0256892 A1* | 11/2005 | Harken | G06Q 10/10 |
| 2005/0262191 A1* | 11/2005 | Mamou | G06F 16/254 |
| | | | 709/203 |
| 2006/0090163 A1* | 4/2006 | Karisson | G06F 11/3409 |
| | | | 718/105 |
| 2008/0126639 A1 | 5/2008 | Oakes | |
| 2008/0163249 A1* | 7/2008 | Garza | G06F 9/546 |
| | | | 719/314 |
| 2009/0063617 A1 | 3/2009 | Calow | |
| 2013/0173803 A1* | 7/2013 | Pijewski | G06F 9/5072 |
| | | | 709/226 |
| 2013/0254318 A1* | 9/2013 | Colar | H04L 47/622 |
| | | | 709/206 |
| 2014/0075445 A1* | 3/2014 | Wang | H04L 43/08 |
| | | | 718/104 |
| 2014/0153422 A1* | 6/2014 | Nambiar | H04L 47/28 |
| | | | 370/252 |
| 2014/0325519 A1* | 10/2014 | Li | H04L 67/01 |
| | | | 718/103 |
| 2015/0040133 A1* | 2/2015 | Caufield | G06F 9/505 |
| | | | 718/103 |
| 2015/0046279 A1* | 2/2015 | Wang | G06F 9/5027 |
| | | | 705/26.3 |
| 2015/0058484 A1 | 2/2015 | Mehta | |
| 2016/0021196 A1 | 1/2016 | Gaurav | |
| 2016/0080484 A1 | 3/2016 | Earl | |
| 2016/0117253 A1* | 4/2016 | Sprouse | G06F 12/0868 |
| | | | 711/103 |
| 2018/0173777 A1 | 6/2018 | Cannaliato | |
| 2018/0270299 A1* | 9/2018 | McCourtney | G06F 9/451 |
| 2018/0352053 A1 | 12/2018 | Kosim-Satyaputra | |
| 2019/0042305 A1* | 2/2019 | McDonnell | G06F 9/5088 |
| 2019/0089647 A1* | 3/2019 | Das | H04L 47/72 |
| 2019/0102536 A1 | 4/2019 | Chopra | |
| 2019/0182168 A1* | 6/2019 | Bastide | H04L 47/24 |
| 2020/0026710 A1* | 1/2020 | Przada | G06F 16/254 |
| 2020/0162380 A1 | 5/2020 | Pilkington | |
| 2020/0371839 A1* | 11/2020 | Bonagiri | G06F 9/5027 |
| 2021/0149728 A1* | 5/2021 | Wood | G06F 9/5038 |
| 2021/0202031 A1* | 7/2021 | Tevet | G16B 20/00 |
| 2022/0414113 A1 | 12/2022 | Xing | |
| 2023/0108209 A1* | 4/2023 | Pilkington | H04L 67/1012 |
| | | | 709/217 |
| 2023/0109396 A1 | 4/2023 | Jain | |
| 2023/0161652 A1 | 5/2023 | Soule | |
| 2023/0176934 A1 | 6/2023 | Soule | |
| 2023/0195597 A1 | 6/2023 | Guzman | |
| 2023/0195601 A1 | 6/2023 | Rajesh | |
| 2023/0198875 A1 | 6/2023 | Rajesh | |
| 2023/0231912 A1 | 7/2023 | Vohra | |

FOREIGN PATENT DOCUMENTS

| | | |
|---|---|---|
| CN | 107301113 A | 10/2017 |
| CN | 109271435 A | 1/2019 |
| CN | 109299180 A | 2/2019 |
| CN | 109861850 A | 6/2019 |
| JP | 2008269152 A | 11/2008 |
| JP | 2017529585 A | 10/2017 |
| WO | 2016010936 A1 | 1/2016 |
| WO | 2021099903 A1 | 5/2021 |
| WO | 2023057231 A1 | 4/2023 |

OTHER PUBLICATIONS

"Method to Provide Resilience to Failures Due to Rate Limiting in Long Running Processes by Automatically Pausing and Resuming in an Adaptive Way", An IP.com Prior Art Database Technical Disclosure, Authors et al.: Disclosed Anonymously, IP.com No. IPCOM000263829D, IP.com Electronic Publication Date: Oct. 8, 2020, 4 pages.

(56) References Cited

OTHER PUBLICATIONS

"Rate Limits", AdWords API, downloaded from the internet on Jun. 23, 2021, 9 pages, <https://developers.google.com/adwords/api/docs/guides/rate-limits>.

International Search Report and Written Opinion, International Application No. PCT/EP2022/076446, International Filing Date Sep. 22, 2022.

International Search Report and Written Opinion, International Application No. PCT/IB2020/060699, International Filing Date Nov. 13, 2020.

Lee et al., "Optimal Design and Use of Retry in Fault Tolerant Realtime Computer Systems", An IP.com Prior Art Database Technical Disclosure, Original Publication Date: May 1, 1984, IP.com No. IPCOM000128483D, IP.com Electronic Publication Date: Sep. 16, 2005, 21 pages.

Mell et al., "The NIST Definition of Cloud Computing", Recommendations of the National Institute of Standards and Technology, Special Publication 800-145, Sep. 2011, 7 pages.

Poncini et al., "Optimizing Transmission Rate Selection In Basic Service Sets", An IP.com Prior Art Database Technical Disclosure, Original Publication Date: Sep. 22, 2009, IP.com No. IPCOM000188114D, IP.com Electronic Publication Date: Sep. 22, 2009, Copyright: Copyright 2009 Microsoft, 21 pages.

Shue et al., "Performance Isolation and Fairness for Multi-Tenant Cloud Storage", USENIX Association, 10th USENIX Symposium on Operating Systems Design and Implementation (OSDI '12), pp. 349-362.

Tan et al., "Tempo: Robust and Self-Tuning Resource Management in Multi-tenant Parallel Databases", Proceedings of the VLDB Endowment, vol. 9, No. 10, pp. 720-731, Copyright 2016 VLDB Endowment 2150-8097/16/06.

Zhang, Will, "Improving Microservice Reliability with Istio", 2020 Association for Computing Machinery, 7 pages, <https://willczhang.github.io/downloads/paper.pdf>.

List of IBM Patents or Patent Applications Treated as Related. Filed Sep. 25, 2023. 2 pages.

* cited by examiner

```
for each page of records for processId job that are being processed:
    unprocessed = number of extracted but unprocessed records associated with
processId at current moment
    cachedRequestsDueTo429 = the records from the current page that resulted in 429
    records429 = size(cachedRequestsDueTo429)
    records200 = number of records from the current page that resulted in 200
rateLimitCoefficient[processId] = records429 / unprocessed
maxConcurrentRecords[processId] = 0
expectedProcessTime = 60000 // . default system variable
    if records200 > 0
maxConcurrentRecords[processId] = records200
    If (rateLimitCoefficient[processId] == 0 // no 429. might have delayed too much
&& pacingDelay[processId] >0)  // there is a delay
        pacingDelay[processId] = pacingDelay[processId]/2
    else
If rateLimitCoefficient[processId] < coefficient // all good
 do nothing
        else
        // the number of 429 is more than the acceptable level
        pacingDelay[processId] = expectedProcessTime *
((unprocessed -maxConcurrentRecords[processId])
/maxConcurrentRecords[processId]) * rateLimitCoefficient[processId]
    // 1. slow down the extract
        recordChunks = unprocessed / maxConcurrentRecords[processId]
        // first pause until there is a good chance that the 429 records can be processed
extract.pausedUntil(currentTime + recordChunks.length * pacingDelay[processId])
// then continue extract at a slower pace
extract.applyNewExtractConfig(
maxConcurrentRecords[processId], pacingDelay[processId]
// 2. control the retries of the 429s
for (chunk in recordChunks)
retry chunk
delay pacingDelay[processId] ms
```

MANAGING EXTRACT, TRANSFORM AND LOAD SYSTEMS

TECHNICAL FIELD

The technical character of the present invention generally relates to the field of managing systems, and more specifically, to managing Extract, Transform and Load (ETL) systems.

BACKGROUND

A typical ETL system is configured to process high volumes of data asynchronously in a highly parallel way. A common use of ETL systems is to process batches of requests in database applications. In an ETL system, typically multiple tenants access a common processing engine, with data being extracted (i.e. read) from one tenant, transformed by the processing engine in some way defined by the request at hand and then loaded (i.e. written) to the same tenant or a different tenant. Commonly the unit of data subject to ETL processing is a record or a page of records, where a page is an aggregate unit of multiple records capable of containing up to a certain fixed number of records. A multi-tenant ETL method is managed by an ETL processing application. The extraction and loading phases of the ETL method are often managed independently by respective applications, referred to as a source connector and a target connector. The source connector application, ETL processing application and target connector application will often be from different vendors and are run independently of each other.

A general aim in an ETL method is to complete the extraction, transformation and load phases so that data flows from the source system (or source connector) to the target system (or target connector) via the processing engine (or ETL processing application) in an effective and timely manner. In practice, a primary consideration for achieving this is how to keep the number of rate-limiting errors that occur in each of the extract, transform and load phases to acceptably low levels. In some use cases, it is preferable to keep the number of rate-limiting errors low, even if as a consequence it takes longer to process a batch of requests. Rate limit errors may be defined in terms of concurrency or throughput. A concurrency rate limit is a rate limit defined by a maximum permitted number of requests that are allowed to be pending at any one time. An ETL processing system may be rate-limited by retry with delay, throttling, leaky bucket, fixed window, sliding log, sliding window and/or pacing.

BRIEF SUMMARY

According to an embodiment of the present invention, an extract, transform and load (ETL) engine operable to perform an ETL method with extract, transform and load phases, the ETL engine comprising: an extract engine operable to perform an extract phase by extracting units of data from a source system; a queue configured to receive units of data from the extract engine; a processing engine operable to perform the transform and load phases by receiving units of data from the queue, transforming and loading the units of data to a target system; and a pace manager operable to monitor the queue, such that, if the pace manager detects that there are more than a threshold number of requeued units of data in the queue, then the pace manager is operable to impose at least one restriction on the extract phase.

According to an embodiment of the present invention, a system for hosting an extract, transform and load, ETL, method with extract, transform and load phases, the system comprising: a source system operable to supply units of data in an extract phase; a target system operable to receive units of data in a load phase; and an extract, transform and load engine comprising: an extract engine operable to perform the extract phase by extracting units of data from the source system; a queue configured to receive units of data from the extract engine; a processing engine operable to perform the transform and load phases by receiving units of data from the queue, transforming the units of data and loading the units of data to the target system; and a pace manager operable to monitor the queue, wherein, if the pace manager detects that there are more than a threshold number of requeued units of data in the queue, then the pace manager is operable to impose at least one restriction on the extract phase.

According to an embodiment of the present invention, an extract, transform and load (ETL) method, the method comprising: an extract phase of extracting units of data from a source system and placing them in a queue; a transform phase of receiving units of data from the queue and processing them; and a load phase of loading units of data that have been processed to a target system, wherein the method: requeues units of data that are subject to a rate limit error in the load phase; and monitors the queue to detect requeued units of data therein and, if there are more than a threshold number of requeued units of data in the queue, imposes at least one restriction on the extract phase.

BRIEF DESCRIPTION OF THE DRAWINGS

In the following, the present invention will further be described by way of example only with reference to exemplary embodiments illustrated in the Figures.

FIG. 6 shows an example code listing for implementing an ETL method according to a specific example.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
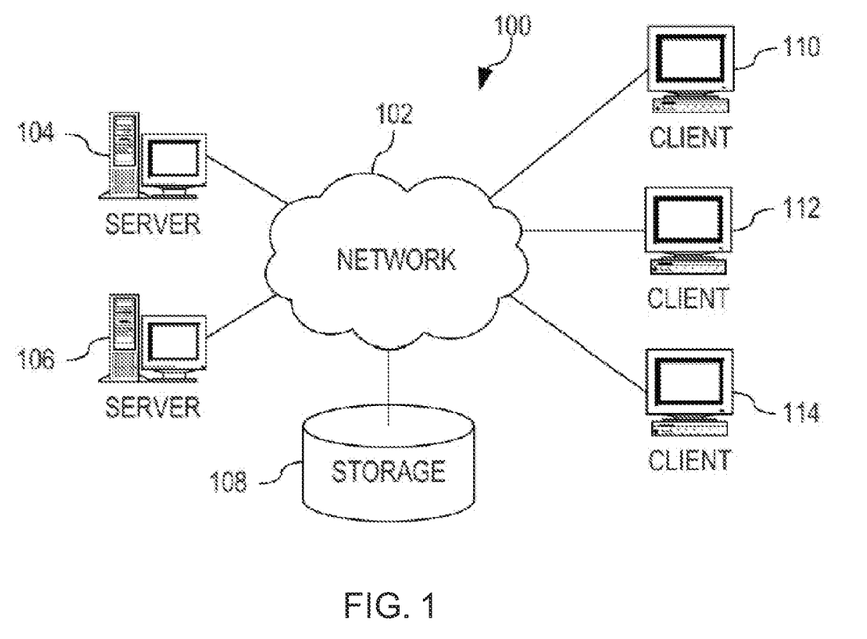
FIG. 1 is a schematic diagram of a client-server network system in which embodiments of the disclosure may be implemented.

FIG. 1 is a schematic diagram of a client-server network system suitable for hosting a multi-tenant ETL system according to embodiments of the disclosure. A distributed data processing system 100 includes a network 102. The network 102 is a medium used to provide communication links between various devices and computers connected together within the distributed data processing system 100. The network 102 may include connections, such as wire, wireless communication links, or fiber optic cables.

A first server 104 and a second server 106 are connected to the network 102 along with a storage unit 108. In addition, clients 110, 112, and 114 are also connected to the network 102. Clients 110, 112, and 114 may be edge devices, for example, personal computers, network computers, Internet of Things (IoT) devices, or the like. The first server 104 may provide data, such as boot files, operating system images, and applications to clients 110, 112, and 114. Clients 110, 112, and 114 are clients to the first server 104. The distributed data processing system 100 may include additional servers, clients, and other devices not shown.

The distributed data processing system 100 may be the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like.

Figure 2:
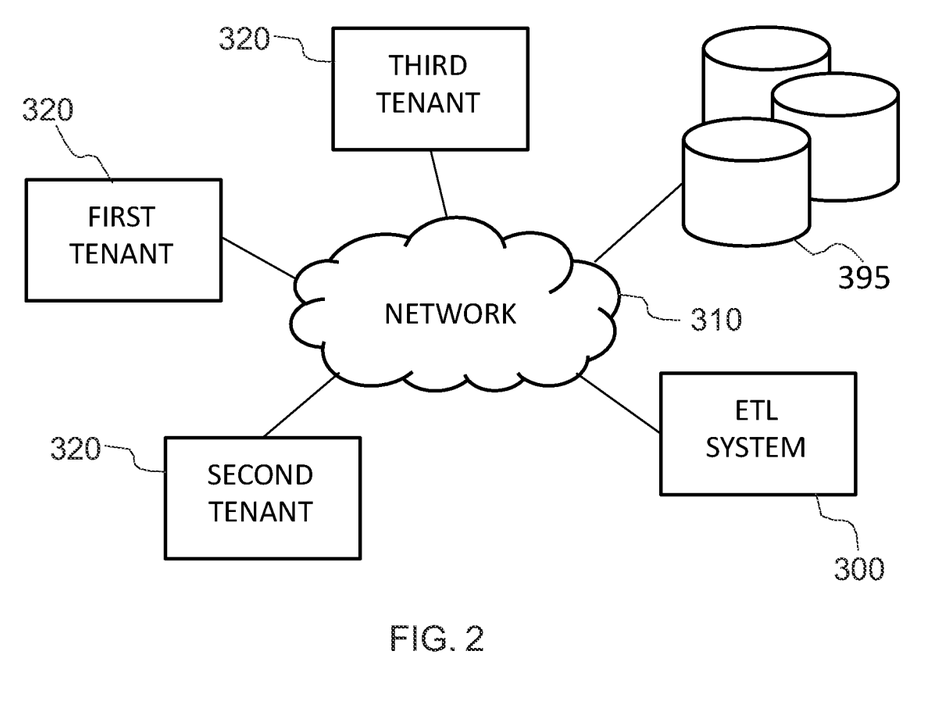
FIG. 2 is a schematic diagram of a multi-tenant ETL network system in which embodiments of the disclosure may be implemented.

FIG. 2 is a schematic diagram of a multi-tenant ETL system according to an embodiment of the present invention. A plurality of tenants 320 can have access to an ETL system 300 via a network 310. A data store 395 can also be provided for storing session data. The ETL system 300 can comprises various components contributing to the processing of ETL batches which can contain very large volumes of data (e.g., millions of records). These components can include a controller system (e.g., batch controller), systems from which the controller extracts data, SaaS applications or Enterprise systems, and a processing engine that processes extracted records. Any or all these components can potentially interact with other external systems via a communication network 310 (e.g., the Internet).

Figure 3:
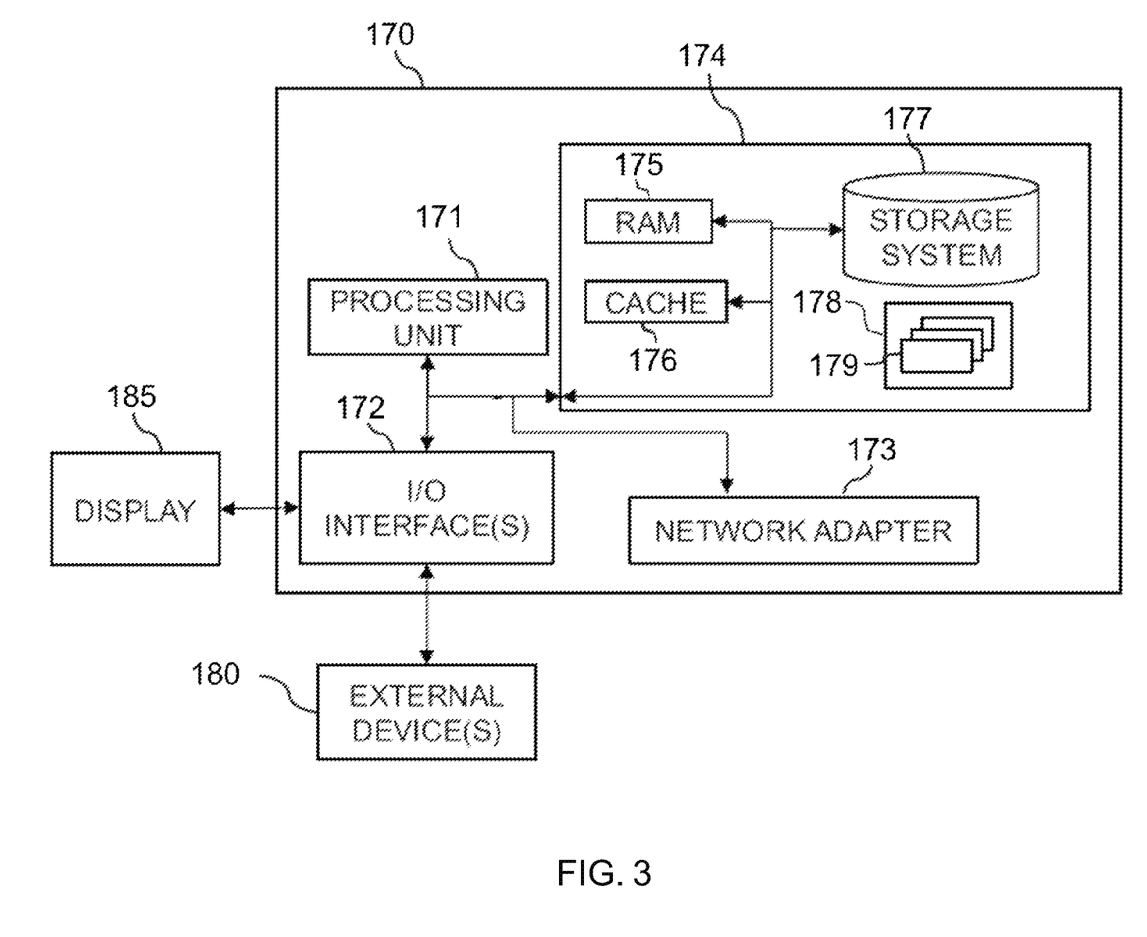
FIG. 3 is a schematic diagram of a computer system in which system elements of embodiments of the disclosure may be implemented.

FIG. 3 shows a computer system 170 as may form a node in an ETL system as described above or below. The tenants 320 or the ETL system 300 may be implemented in a computer system 170 as shown. The computer system 170 includes a processing unit 171, a system memory 174, and a bus that couples various system components including system memory 174 to processing unit 171. The system memory 174 can include computer system readable media in the form of volatile memory, such as random-access memory (RAM) 175 and/or cache memory 176. The computer system 170 may further include other removable/non-removable, volatile/non-volatile computer system storage media. In such instances, each can be connected to the bus by one or more data media interfaces. The memory 174 may include at least one program product having a set (e.g., at least one) of program modules that are configured to carry out the functions of proposed embodiments. The memory 174 may include a computer program product having program executable by the processing unit 171 to cause an Input/Output (I/O) interface 172 to perform a method for sharing processing resource of a multi-tenant ETL system 300. A program 178, having a set (at least one) of program modules 179, may be stored in the memory 174 or in storage system 177. The program modules 179 generally carry out the functions and/or methodologies of proposed embodiments for sharing processing resource of a multi-tenant ETL system 300. The computer system 170 may also communicate with one or more external devices 180 such as a keyboard, a pointing device, a display 185, etc.; one or more devices that enable a user to interact with computer system 170; and/or any devices (e.g., network card, modem, etc.) that enable computer system 170 to communicate with one or more other computing devices. Such communication can occur via Input/Output (I/O) interfaces 172. The computer system 170 can communicate with one or more networks such as a LAN, a WAN, and/or a public network (e.g., the Internet) via a network adapter 173.

Figure 4:
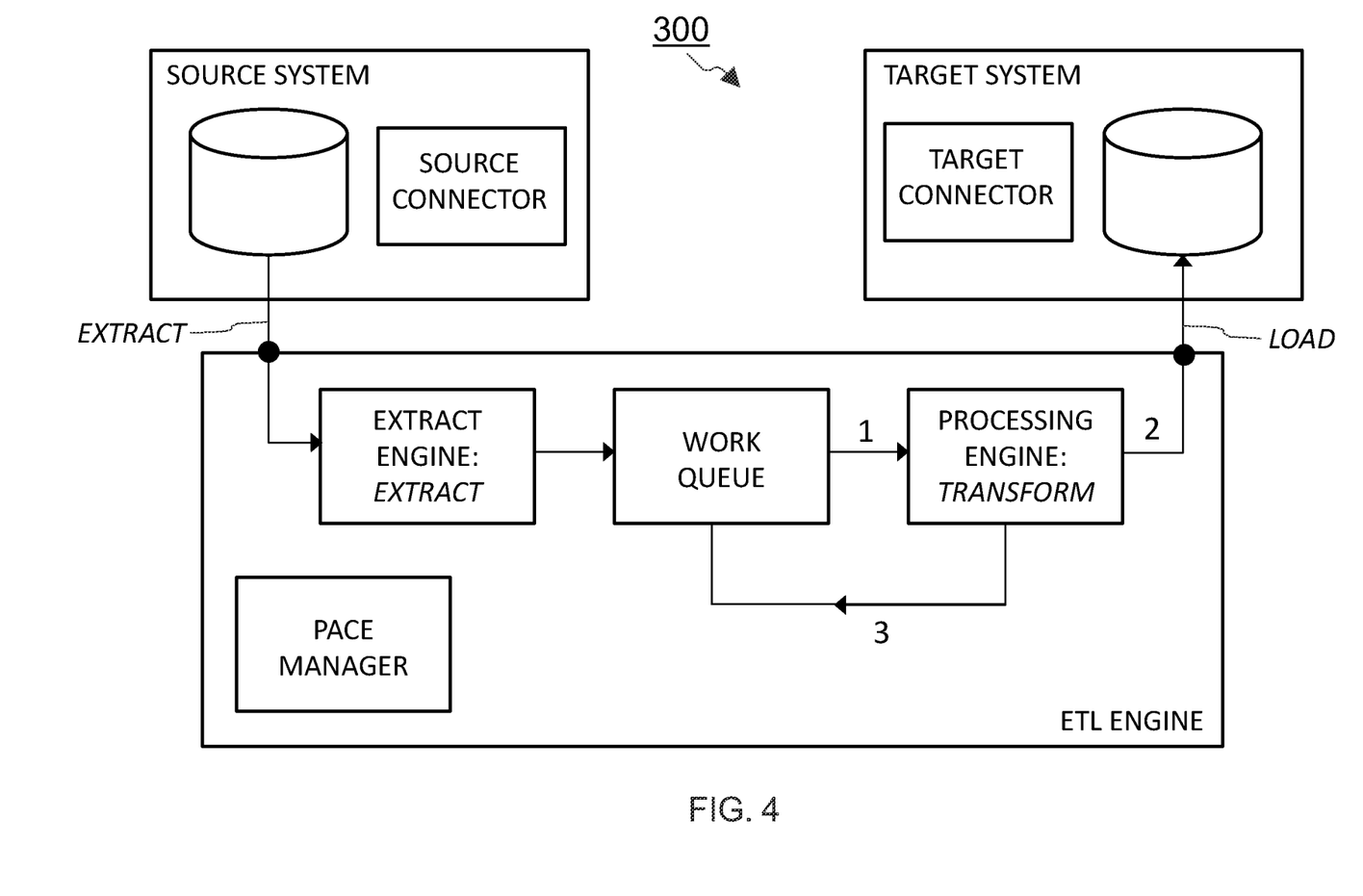
FIG. 4 is a schematic diagram showing features of an ETL system according to embodiments of the disclosure.

FIG. 4 shows an ETL system 300. An ETL engine can extract units of data from a source system via a source connector. The extracted units of data can be input to an extract engine that performs the extract part of the ETL method. After extraction, the units of data can be placed in an unprocessed work queue where they wait for processing. An ETL processing engine can take units of data out of the queue via data path 1 and perform the transform part of the ETL method. The transformed data can then be sent on data path 2 to a target system via a target connector to perform the load part of the ETL method. The process flow through the ETL engine can be controlled by a pace manager. It should be noted that the system actors generally can function in an asynchronous mode of operation, either with push or pull actions.

The three stages of an ETL method can usually be rate limited as follows:

Extract: The extract part can be I/O limited, the extract part being performed by the extract engine which reads the input data from a source system via a source connector and puts the data into the unprocessed work queue.

Transform: The transform part can be limited by processing power of the ETL processing engine, noting that, at least in a cloud system, this processing power can be scaled flexibly to provide a suitable amount of processing power to avoid this being the overall rate-limiting part of the ETL method.

Load: The load part of writing the transformed data to the (external) target system via a target connector can be I/O limited. The load part can most commonly be the overall rate-limiting factor for an ETL method. A rate limit error can be generated by the target system when the number of load requests it receives concurrently or over a given time period exceeds a threshold.

The pace manager of the ETL engine can apply a pacing algorithm to monitor the unprocessed work queue. The function of the pace manager, according to embodiments of the present invention, can be extended beyond the usual role of slowing down data extraction when the queue is seen to have become too long. Moreover, the ETL processing engine can have an extended function, according to embodiments of the present invention, extended beyond solely performing the transform part of the ETL method. Namely, the ETL processing engine can be configured to send back units of data to the queue in a feedback loop 3, if a unit of data is subject to a rate limit error during the load part of the ETL method, as occurs when the target system or the I/O path 2 from the ETL engine to the target system, form a bottleneck based on either throughput or concurrency. Moreover, the pace manager can apply a pacing algorithm that can be sensitive to units of data that have been fed back to the queue via data path 3 as a result of rate limit errors occurring on path 2. The pacing algorithm can have regard to a rate limit coefficient that can define the maximum proportion of requeued units of data that are permitted to be present in the unprocessed work queue before pacing measures are activated. In the specific example below, the rate limit coefficients can be defined with the parameter 'rateLimitCoefficient' which can be expressed as a percentage value of the maximum permitted proportion of rate limit errors permitted to be present in the queue.

The requeued units of data can be those that have been requeued via feedback data path 3 from the ETL processing engine to the queue as a result of a rate limit error having been generated by the target system during the load phase of the ETL method. When the pacing algorithm detects that the proportion of requeued requests in the work queue is above the threshold defined by the rate limit coefficient, the pace manager can initiate active pacing management control of the throughput of requests. Pacing management can be undertaken by the following measures:

temporarily halting extraction for a pause time to allow requeued requests to be reprocessed and loaded without new requests being added to the queue     defining a retry schedule for the requeued units to be sent to the ETL processing engine, so these are not processed too fast to cause the rate limit errors to happen again during the load phase     defining an appropriate pacing for future extractions after extraction is resumed following expiry of the pause so that load phase rate limit errors are avoided in future Each of these active pacing management measures is now discussed in more detail.

The pace manager can pause extraction for a calculated amount of time, referred to as the extract pause. The calculation of the length of the extract pause can provide a pause time that is long enough to give at least most of the requeued units of data enough time to flush through the ETL processing engine and be resent to the target system.

The pace manager can define a time schedule (e.g., a retry frequency or retry interval) for sending the requeued units of data from the queue to the ETL processing engine for reprocessing to ensure that these are not processed by the ETL processing engine too close together in time and causing a risk of the target system once more generating rate limit errors during the load phase of the ETL method. The requeued units of data can be given precedence over other units of data in the queue, i.e., over units of data that have been extracted and are waiting to be processed by the ETL processing engine for the first time.

The pace manager can impose a delay on future extracts to slow these down. This can be done by creating a pacing delay to insert into future extracts to slow these down. The size of the pacing delay can be calculated by taking account of the number or proportion of rate limit errors and is aimed at avoiding the rate limit errors again exceeding an acceptable level. In some ETL processes, the units of data can be based on processing records, wherein the records are aggregated into pages. A page can be a data unit defined by a page size consisting of a plurality of records. For ETL systems of this kind that extract data on a page-by-page basis, the pace manager can also slow down future extracts by reducing the page size, i.e., the number of records extracted per extraction. The purpose of applying the pacing delay can be to avoid the same problem recurring when extraction recommences after the extract pause is over. This strategy can be effective, based on the high occurrence of rate limit errors generated in the load phase of the ETL method indicating that this can be the rate limiting part of the overall ETL method, as is often the case in ETL systems. In the specific example below, the extract pacing delays are defined with the parameter 'pacingDelays' which can be expressed in milliseconds.

When the pace manager detects that the number of rate limit errors generated by the target system has dropped, as determined by its monitoring of the queue, the pace manager can relax or remove the extract limitations. For example, the extract pacing delay can be shortened, e.g., by halving its value. The relaxation can be configured to have only a single step or can be configured to have multiple steps. Moreover, if a variable page size has been used for pacing, then the reduced page size can be returned to its default size or, if multiple steps are envisaged, to an intermediate size. The pace manager can not only act to relax or lift the extract restriction(s) in the case of a reduction or increase in the number of requeued units of data, but also can act to increase the extract restriction(s) in the case of an increase in the number of requeued units of data. For example, each time an integer multiple of the original threshold is exceeded; twice, three times etc. Accordingly, more generally, it will be understood that the pace manager can be operable to vary the extract restriction(s) responsive to monitoring the queue with respect to changes in the number of requeued units of data in the queue.

The pacing algorithm optionally can monitor the history of units of data in the ETL engine, so that units of data that are too old or have failed too many times can be deleted. Accordingly, units of data can be time stamped with a start time, e.g., when they were extracted, when they were first placed in the queue, or when they were first processed. If an elapsed time since the start time exceeds a maximum, then the request can be deleted. The maximum permitted age can therefore be represented as a system timeout value that can be set to define the maximum permitted amount of time allowed for processing a request, e.g., set to a value such as 60 seconds. In the specific example below, this can be represented with the parameter 'expectedProcessTime' and can be given the value of 60000, i.e., 60 seconds in milliseconds. The timeout value can be set to a small multiple of the average expected process time for a request, e.g., 2 to 10 times. Any units of data that exceed the expected process time can be deleted and a corresponding error can be sent to the source system via the source connector.

As well as or instead of an age criterion for deletion, deletion can be triggered by a request having failed by more than a threshold number of times, i.e., having been processed and requeued more than a threshold number of times following multiple rate limit errors during the load phase. The threshold can be, for example, 2, 3, 4 or 5. This history-based monitoring can be linked to or be independent of the triggering of active pacing management, or a mixture of the two. For example, time-out deletion of requests can be permanently active, whereas retry-based deletion of requests can be selectively activated with the active pacing management measures described above.

In the above, it is assumed that it is the target system that generates the rate limit errors. It may also be possible for the processing engine to generate these errors, or some other component of the ETL engine, such as the pace manager through monitoring the target connector, based on what is being output to the target system.

With the above-described approach, the processing of extracted records can be moderated based on feedback obtained by rate limit errors detected during the load phase of the ETL method. The ETL processing engine can operate more efficiently, since it will not run ahead of the capacity of the target system to receive loads, and therefore should be able to avoid having to multiply reprocess the same records. The ETL method can therefore complete with fewer errors. Moreover, although the proposed approach coordinates the extract and load stages of an ETL method, the coordination can be done on a very small slice of data and in a very limited and specific way that avoids tight coupling. Consequently, the proposed approach can be compatible with micro-service architectures.

Figure 5:
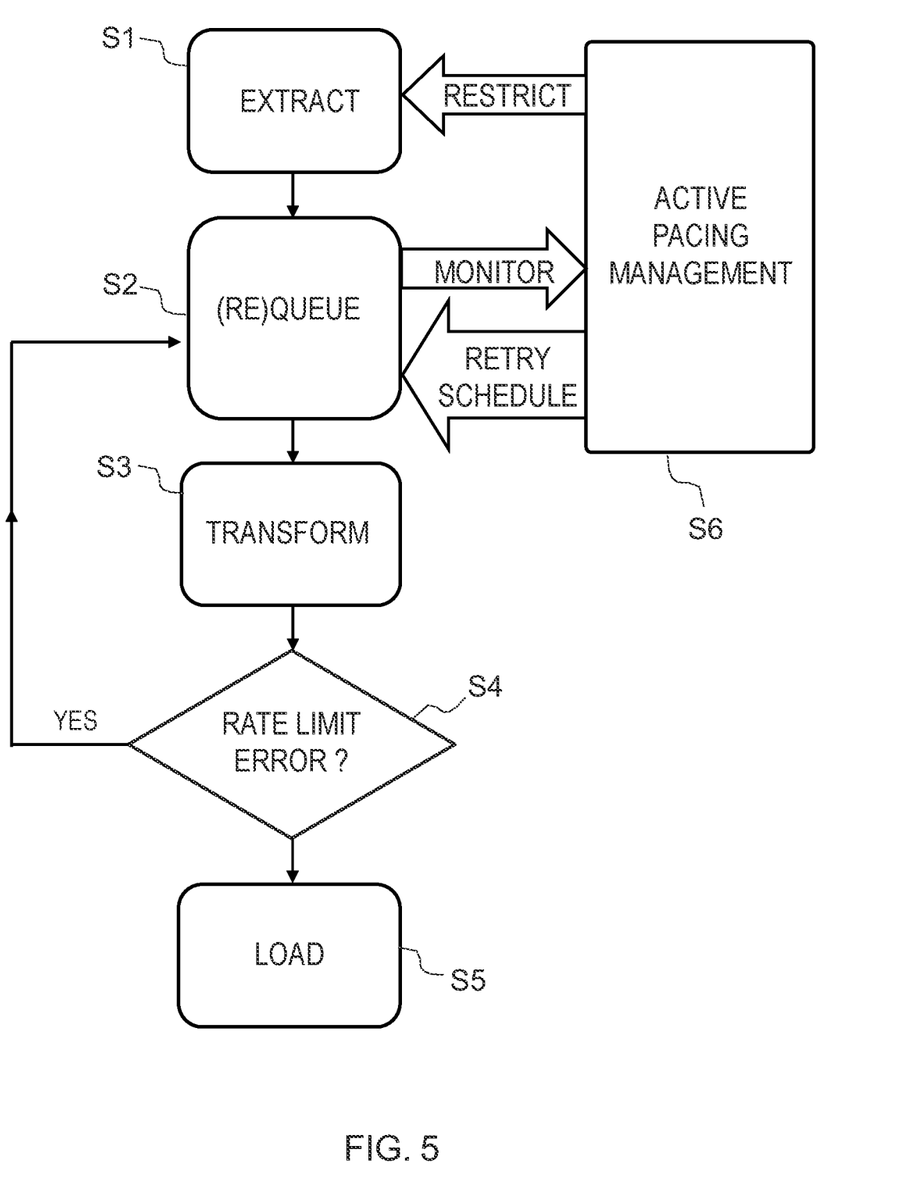
FIG. 5 is a flow diagram showing an ETL method according to embodiments of the disclosure.

FIG. 5 is a flow diagram showing a process flow in the above-described system. Step S1 shows an extract phase of extracting units of data from a source system. Step S2 shows units of data being queued after extraction (or when replaced in the queue following a load error). Step S3 shows a transform phase in which units of data received from the queue can be processed. Steps S4 & S5 show a loading phase including loading (S5) and testing for a rate limit error (S4) in the load phase. If there is a rate limit error, then the unit of data can be requeued as indicated by the feedback path. Active pacing management control S6 can be performed through monitoring data units in the queue. If there are more than a threshold number of requeued units of data in the queue, then restrictions can be imposed on the extract phase S1 and a retry schedule can be applied for sending the requeued units of data to the transform phase S3. The active pacing management control can also act to delete units of data from the queue based on age or repeated load phase rate limit errors.

FIG. 6 shows an example code listing for implementing an ETL method according to a specific example.

In summary, an extract, transform and load system has been described that can have a queue for holding units of data between extraction and transformation. When units of data suffer a rate limit error in the load phase, they can be requeued so they can be resubmitted for transformation. The contents of the queue can be monitored and, if too many requeued units of data are detected in the queue, then this can be taken as an indicator of an unacceptable number of rate limit errors and active pacing management can be triggered. A retry schedule can be defined for the requeued units of data. Extraction can be temporarily halted to allow the requeued units of data to be retransformed without more units of data queuing up. Then, after the suspension is lifted, a pacing delay can be inserted between subsequent extract events to avoid the same load phase bottleneck recurring.

It will be clear to one of ordinary skill in the art that all or part of the logical process steps of the preferred embodiment can be alternatively embodied in a logic apparatus, or a plurality of logic apparatus, comprising logic elements arranged to perform the logical process steps of the method and that such logic elements can comprise hardware components, firmware components or a combination thereof.

It will be equally clear to one of skill in the art that all or part of the logic components of the preferred embodiment can be alternatively embodied in logic apparatus comprising logic elements to perform the steps of the method, and that such logic elements can comprise components such as logic gates in, for example, a programmable logic array or application-specific integrated circuit. Such a logic arrangement can further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention can be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment can alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 7:
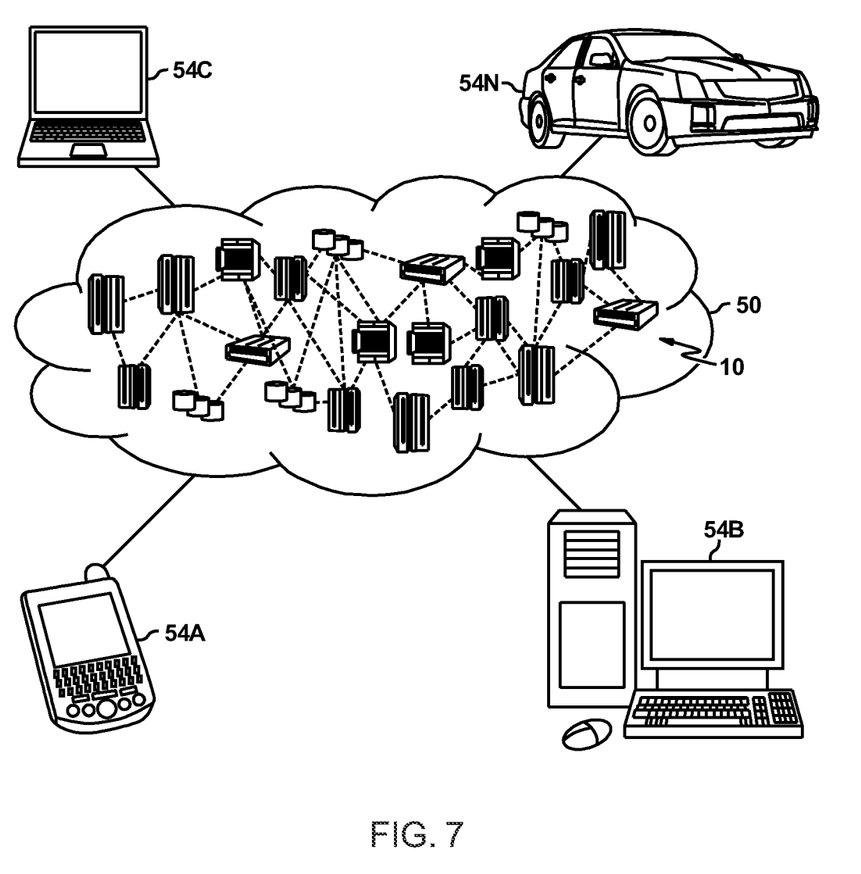
FIG. 7 depicts a cloud computer system according to an embodiment of the disclosure.

Referring now to FIG. 7, illustrative cloud computer system 50 is depicted. As shown, cloud computer system 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computer system 50 can communicate with any type of computerized device over any type of network and/or network addressable connection (e.g., using a web browser).

Figure 8:
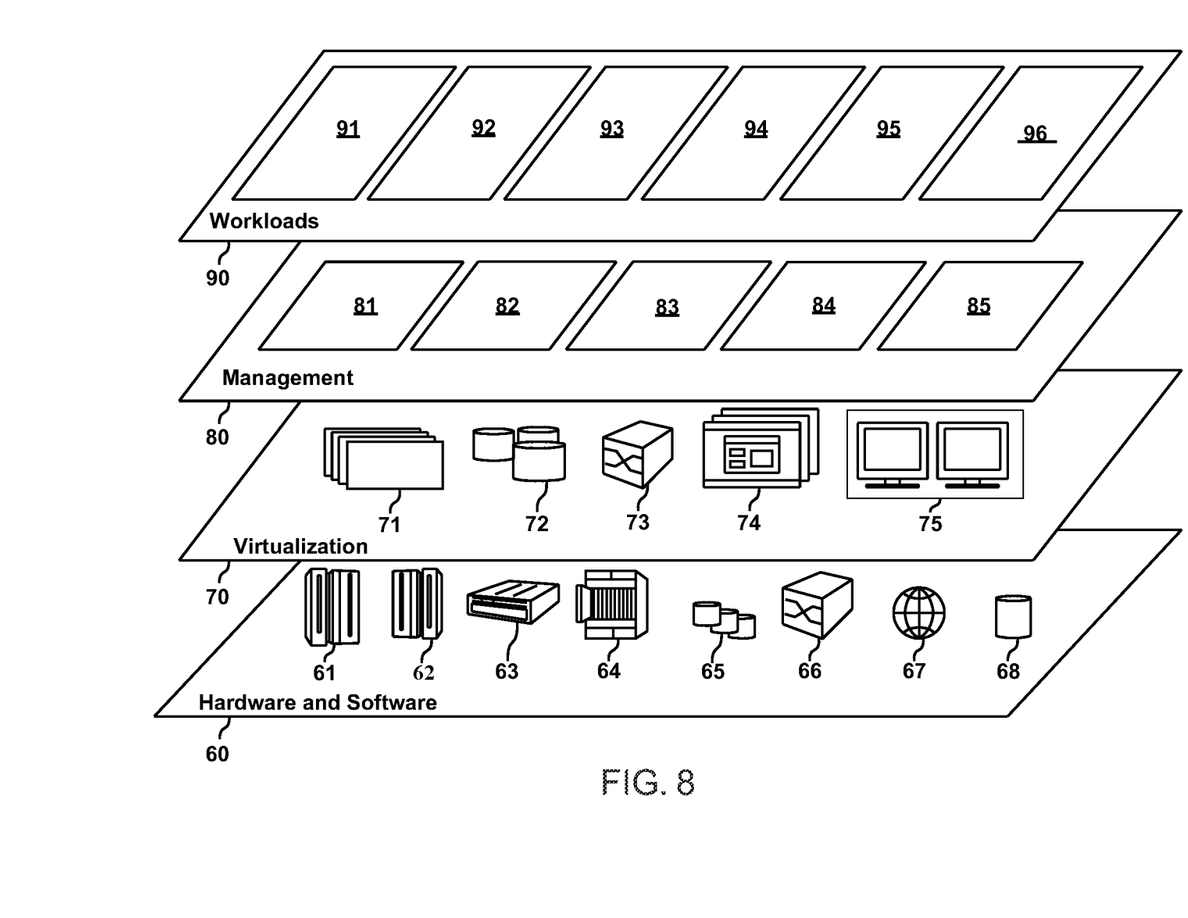
FIG. 8 depicts abstraction model layers according to an embodiment of the disclosure.

Referring now to FIG. 8), a set of functional abstraction layers provided by cloud computer system 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computer system may be utilized. Examples of workloads and functions which may be provided from this layer can include: mapping and navigation 91; software lifecycle management 92; virtual classroom education delivery 93; data analytics processing 94; transaction processing 95; and an ETL engine 96 (300) according to embodiments of the disclosure.

It will be clear to one skilled in the art that many improvements and modifications can be made to the foregoing exemplary embodiment without departing from the scope of the present disclosure.

What is claimed is:

1. An extract, transform and load (ETL) engine operable to perform an ETL method with extract, transform and load phases, the ETL engine comprising:
    an extract engine operable to perform an extract phase by extracting units of data from a source system;
    a queue configured to receive units of data from the extract engine;
    a processing engine operable to perform the transform and load phases by receiving units of data from the queue, transforming and loading the units of data to a target system;
    a pace manager operable to monitor the queue, such that, if the pace manager detects that there are more than a threshold number of requeued units of data in the queue, then the pace manager is operable to impose at least one restriction on the extract phase; and
    the pace manager being further operable to monitor a history of units of data held in the queue and to delete one or more of the units of data based on their history, respectively, when the units of data fail a threshold number of times.

2. The ETL engine of claim 1, wherein the retry schedule is set so as to avoid rate limit errors occurring again in the load phase after the units of data have been reprocessed by the processing engine.

3. The ETL engine of claim 2, wherein the at least one extract restriction includes imposing a pause on extraction for an amount of time set according to an expected amount of time needed to reprocess the requeued units of data taking account of the retry schedule.

4. The ETL engine of claim 1, wherein the at least one extract restriction includes introducing a pacing limitation to limit how many units of data are extracted per unit time.

5. The ETL engine of claim 4, wherein the at least one extract restriction further includes reducing size of the units of data.

6. The ETL engine of claim 1, wherein the threshold number takes account of how many requeued units of data there are compared with a total number of units of data held in the queue.

7. The ETL engine of claim 1, wherein are received from the target system.

8. The ETL engine of claim 1, wherein a load phase rate limit error occurs when more than a threshold number of transformed units of data are loaded.

9. The ETL engine of claim 1, wherein the pace manager is further operable to vary the at least one extract restriction responsive to monitoring the queue in respect of changes in the number of requeued units of data in the queue.

10. The ETL engine of claim 1, wherein the pace manager is further operable to monitor at least one history attribute of the units of data held in the queue and to delete one or more of the units of data based on their history attributes based on a retry schedule for reprocessing the requeued units of data by the processing engine.

11. The ETL engine of claim 10, wherein at least one history attribute is age of a data unit in the ETL engine, wherein a unit of data is deleted if it has an age greater than a maximum age limit.

12. The ETL engine of claim 10, wherein at least one history attribute is a value indicating how many times a unit of data has been processed by the processing engine, wherein a unit of data is deleted if it has been processed more than a maximum permitted number of times.

13. A system for hosting an extract, transform and load, ETL, method with extract, transform and load phases, the system comprising:
- a source system operable to supply units of data in an extract phase;
- a target system operable to receive units of data in a load phase; and
- an extract, transform and load engine comprising:
  - an extract engine operable to perform the extract phase by extracting units of data from the source system;
  - a queue configured to receive units of data from the extract engine;
  - a processing engine operable to perform the transform and load phases by receiving units of data from the queue, transforming the units of data and loading the units of data to the target system;
  - a pace manager operable to monitor the queue, wherein, if the pace manager detects that there are more than a threshold number of requeued units of data in the queue, then the pace manager is operable to impose at least one restriction on the extract phase; and
  - the pace manager being further operable to monitor a history of units of data held in the queue and to delete one or more of the units of data based on their history, respectively, when the units of data fail a threshold number of times.

14. An extract, transform and load (ETL) method, the method comprising:
- an extract phase of extracting units of data from a source system and placing them in a queue;
- a transform phase of receiving units of data from the queue and processing them; and
- a load phase of loading units of data that have been processed to a target system, wherein the method:
  - requeues units of data that are subject to a rate limit error in the load phase;
  - monitors the queue to detect requeued units of data therein and, if there are more than a threshold number of requeued units of data in the queue, imposes at least one restriction on the extract phase; and
  - monitors a history of units of data held in the queue and deletes one or more of the units of data based on their history, respectively, when the units of data fail a threshold number of times.

15. The ETL method of claim 14, wherein the retry schedule is set so as to avoid rate limit errors occurring again in the load phase after the units of data have been reprocessed in the transform phase.

16. The ETL method of claim 15, wherein the at least one extract restriction includes imposing a pause on extraction for an amount of time set according to an expected amount of time needed to reprocess the requeued units of data taking account of a retry schedule.

17. The ETL method of claim 14, wherein the at least one extract restriction includes introducing a pacing limitation to limit how many units of data are extracted per unit time.

18. The ETL method of claim 17, wherein the at least one extract restriction further includes reducing size of the units of data.

19. The ETL method of claim 14, wherein the threshold number takes account of how many requeued units of data there are compared with a total number of units of data held in the queue.

20. The ETL method of claim 14, wherein units of data subject to a rate limit error are received from the target system.

* * * * *